United States Patent [19]

Kondo

[11] Patent Number: 4,948,251

[45] Date of Patent: Aug. 14, 1990

[54] OPTICAL HETERODYNE MEASURING APPARATUS

[75] Inventor: Michio Kondo, Nagoya, Japan

[73] Assignee: Brother Kogyo Kabushiki Kaisha, Aichi, Japan

[21] Appl. No.: 351,091

[22] Filed: May 12, 1989

[30] Foreign Application Priority Data

May 16, 1988 [JP] Japan .............................. 63-64319[U]

[51] Int. Cl.$^5$ ................................................ G01B 9/02
[52] U.S. Cl. ..................................... 356/349; 356/351; 356/359
[58] Field of Search ......................... 356/349, 351, 359

[56] References Cited

U.S. PATENT DOCUMENTS

| 4,360,271 | 11/1982 | Downs et al. | 356/351 |
| 4,688,940 | 8/1987 | Sommangron et al. | 356/349 |
| 4,824,251 | 4/1989 | Slotwinski et al. | 356/349 |

Primary Examiner—Davis L. Willis
Assistant Examiner—Matthew W. Koren
Attorney, Agent, or Firm—Oliff & Berridge

[57] ABSTRACT

An optical heterodyne apparatus wherein two linearly polarized reference beams having different frequencies, and two linearly polarized measuring beams identical with the reference beams are obtained from a laser beam or beams which is/are transmitted from a laser source to a measuring portion of the apparatus through an optical fiber. The apparatus includes an optical device for obtaining two reference beams whose beat phases are different from each other by 180°, and two measuring beams whose beat phases are different from each other by 180°, a first pair of photosensors receiving the two reference beams and producing two reference beat signals; a second pair of photosensors receiving the two measuring beams and producing two measuring beat signals, a first differential amplifier receiving the reference beat signals and producing a differentially amplified output; and a second differential amplifier receiving the measuring beat signals and producing a differentially amplified output. A parameter of a subject is measured based on the outputs of the first and second differential amplifiers.

10 Claims, 5 Drawing Sheets

OPTICAL HETERODYNE MEASURING APPARATUS

BACKGROUND OF THE INVENTION

1. Field of the Invention

The present invention relates to an optical heterodyne measuring apparatus for effecting a measurement based on a difference between beat frequencies of reference and measuring beams, and more particularly to improvements in such an optical heterodyne measuring apparatus wherein a laser beam or beams is/are transmitted through a fixed-polarization plane optical fiber, to a measuring portion of the apparatus.

2. Discussion of the Prior Art

There is known an optical heterodyne measuring apparatus, wherein two linearly polarized reference beams having different frequencies, and two linearly polarized measuring beams identical with the reference beams are obtained from a laser beam or beams which is/are transmitted to a measuring portion of the apparatus through a fixed-polarization-plane optical fiber. In this apparatus, a measurement is accomplished based on a difference between the beat frequency of the reference beams, and the beat frequency of the measuring beams which varies depending upon a parameter of a subject which is to be measured. Described more specifically, when one of the two linearly polarized measuring beams is incident upon the subject, that measuring beam is subject to a frequency shift due to the Doppler effect. As a result, the beat frequency of the two measuring beams consisting of the above-indicated one beam reflected by the subject and the other beam also varies by an amount of the Doppler shift of the frequency of the beam incident upon the subject. Based on the difference between the varying beat frequency of the measuring beams and the fixed beat frequency of the reference beams, a desired parameter of the subject such as the surface roughness, surface profile and displacement may be measured. In this type of measuring apparatus, the laser beam or beams is/are propagated from a laser source to the measuring portion through the fixed-polarization-plane optical fiber, whereby the measuring portion is not affected by the heat generated by the laser source, and can be made relatively small-sized and compact.

Generally, the laser source produces two linearly polarized laser beams having mutually perpendicular polarization planes (similar to the two reference or measuring laser beams), or a single linearly polarized laser beam. Where the two linearly polarized laser beams are produced by the laser source, these two laser beams are split by a beam splitter or other means into the two reference beams and the two measuring beams. Where the single laser beam is produced by the laser source, the laser beam is incident upon an optical frequency shifter, to provide two laser beams having different frequencies. These two laser beams are then incident upon a beam splitter or other means, to provide the two reference beams and the two measuring beams.

In such an optical heterodyne measuring apparatus, it is known to detect a change in the beat frequency of the measuring beams, such that the two measuring beams whose beat phases are shifted from each other by 180° are received by respective photosensors, and the electric signals produced by the photosensors are applied to a differential amplifier, so that the detection of the change in the beat frequency is made based on an output of the differential amplifier. This arrangement permits improved accuracy of measurement of the apparatus, since the arrangement is effective to reduce an influence of the noise components included in the intensity amplitudes of the measuring beams.

However, the optical heterodyne measuring apparatus using a differential amplifier which receives the electric signals from the photosensors as described above also suffers from the external disturbances such as heat and vibrations to which the optical fiber is exposed, which disturbances may cause up to about several tens of nanometers of error in the measurement of a surface roughness, for example.

The causes for the above problem will be considered, in the two cases where different types of laser source are used. In one case, the laser source produces two linearly polarized laser beams whose polarization planes are perpendicular to each other and whose frequencies are different from each other. In the other case, the laser source produces a single linearly polarized laser beam.

Where two laser beams are transmitted through optical fiber

The intensity amplitude of the beat signal obtained by interference of the frequency components of the two linearly polarized laser beams includes a noise component whose frequency is the same as the basic beat frequency which is a difference between the frequencies of the two laser beams. This noise component is caused by: poor adjustment or alignment of the laser source and the fixed-polarization-plane optical fiber; manufacturing errors of waveplates and other optical elements; crosstalk between the two modes of propagation of the laser beams through the optical fiber; and elliptical polarization of the linearly polarized laser beams to some extent.

Referring to FIG. 6, for instance, electric field vectors E1 and E2 of two linearly polarized laser beams having mutually perpendicular polarization planes are expressed by the following equations (1) and (2), respectively, and an optical intensity I1 of the interference beam B1 in the direction 45° inclined with respect to the polarization planes of the linearly polarized beams is expressed by the following equation (3).

$$\mathbf{E}_1 = E_1(t)\exp\{-i(\omega_1 t + \Phi_1(t))\} \quad (1)$$

$$\mathbf{E}_2 = E_2(t)\exp\{-i(\omega_2 t + \Phi_2(t))\} \quad (2)$$

$$I_1 = |\sin 45° \cdot \mathbf{E}_1 + \cos 45° \cdot \mathbf{E}_2|^2 \quad (3)$$

$$= |E_1(t)\sin 45° \cdot \exp\{-i(\omega_1 t + \Phi_1(t) + \pi)\} + E_2(t)\cos 45° \cdot \exp\{-i(\omega_2 t + \Phi_2(t))\}|^2$$

$$= \tfrac{1}{2}|E_1(t)|^2 + \tfrac{1}{2}|E_2(t)|^2 + |E_1(t)||E_2(t)| \cdot \cos\{(\omega_1 - \omega_2)t + (\Phi_1(t) - \Phi_2(t))\}$$

It will be understood that a value $(\omega_1 - \omega_2)$ the equation (3) is equivalent to the frequency difference between the two linearly polarized beams, i.e., a basic beat frequency, and that the optical intensity I1 varies with the basic beat frequency. This optical intensity I1 corresponds to the beat signal. In the above equations (1)-(3), $E_1(t)$ and $E_2(t)$ represent the electric field vector amplitudes, $\omega_1$ and $\omega_2$ represent the angular frequencies, and $\Phi_1(t)$ and $\Phi_2(t)$ represent amounts of change in the phases of the propagation modes of the optical fiber.

On the other hand, if the polarization planes of the two linearly polarized laser beams incident upon an optical fiber are misaligned by an angle $\theta$ with respect to the planes of the two propagation modes $HE_{11}{}^y$, as indicated in FIG. 7, an electric field vector Ey of the mode $HE_{11}{}^y$ is represented by the following equation (4), and an optical energy Iy by squaring the electric field vector Ey is represented by the following equation (5). The electric field vector Ex of the mode $HE_{11}{}^x$ and an optical energy Ix are represented by the following equations (6) and (7), respectively.

$$E_y = E_{10}\cos\theta \cdot \exp\{-i(\omega_1 t + \Phi_{10} + \Phi_1(t))\} + \quad (4)$$
$$E_{20}\sin\theta \cdot \exp\{-i(\omega_2 t + \Phi_{20} + \Phi_1(t))\}$$

$$= \left[ E_{10}\cos\theta \cdot \exp\left(-i\left(\frac{\omega_1 - \omega_2}{2}t + \frac{\Phi_{10} - \Phi_{20}}{2}\right)\right) + \right.$$
$$\left. \left(E_{20}\sin\theta \cdot \exp\left(-i\left(\frac{\omega_2 - \omega_1}{2}t + \frac{\Phi_{20} - \Phi_{10}}{2}\right)\right)\right)\right] \cdot$$
$$\exp\left(-i\left(\frac{\omega_1 + \omega_2}{2}t + \frac{\Phi_{10} + \Phi_{20}}{2} + \Phi_1(t)\right)\right)$$

$$I_y = E_{10}^2\cos^2\theta + E_{20}^2\sin^2\theta + \quad (5)$$
$$2E_{10}E_{20}\sin\theta\cos\theta\cos\{(\omega_2 - \omega_1)t + (\Phi_{20} - \Phi_{10})\}$$

$$E_x = E_{10}\sin\theta \cdot \exp\{-i(\omega_1 t + \Phi_{10} + \Phi_2(t))\} + E_{20}\cos\theta \cdot$$
$$\exp\{-i(\omega_2 t + \Phi_{20} + \Phi_2(t))\} \quad (6)$$

$$= \left[ E_{10}\sin\theta \cdot \exp\left(-i\left(\frac{\omega_1 - \omega_2}{2}t + \frac{\Phi_{10} - \Phi_{20}}{2}\right)\right) + \right.$$
$$\left. E_{20}\cos\theta \cdot \exp\left(-i\left(\frac{\omega_2 - \omega_1}{2}t + \frac{\Phi_{20} - \Phi_{10}}{2}\right)\right)\right] \cdot$$
$$\exp\left(-i\left(\frac{\omega_1 - \omega_2}{2}t + \frac{\Phi_{10} - \Phi_{20}}{2} + \Phi_2(t)\right)\right)$$

$$I_x = E_{10}^2\sin^2\theta + E_{20}^2\cos^2\theta + \quad (7)$$
$$2E_{10}E_{20}\sin\theta\cos\theta\cos\{(\omega_2 - \omega_1)t + (\Phi_{20} - \Phi_{10})\}$$

$E_{10}$ and $E_{20}$ represent the electric vector amplitudes of the incident linearly polarized beams, and are precisely expressed as functions of time. $\Phi_{10}$ and $\Phi_{20}$ are the terms representing the initial phases. In the above equation (1) and (2), these terms are omitted, in the interest of simplification. $\Phi_1(t)$ and $\Phi_2(t)$ represent amounts of change in the phases of the modes $HE_{11}{}^y$ and $HE_{11}{}^x$, which vary depending upon the heat, pressure and other parameters to which the optical fiber is exposed. These values $\Phi_1(t)$ and $\Phi_2(t)$ appear in the above equations (1) and (2).

It will be understood from the above equations (5) and (7) that the laser beams corresponding to the two propagation modes emitted from the distal end of the optical fiber include noises whose amplitudes are equal to $2E_{10}E_{20}\sin\theta\cos\theta$ and whose frequencies vary with the basic beat frequency $(\omega_2 - \omega_1)$. The optical energies Iy, Ix correspond to $|E_1(t)|^2$ and $|E_2(t)|^2$ in the above equation (3), respectively. Therefore, the beat signal representative of the optical intensity I1 includes a noise component whose frequency is equal to the basic beat frequency. The above description is based upon the assumption that the laser beams incident upon the proximal end of the optical fiber is completely linearly polarized, and that the polarization planes of the linearly polarized laser beams are misaligned to some extent, with respect to the planes of the two propagation modes of the optical fiber, about the optical axis. Generally, however, the linearly polarized laser beams as produced by a laser beam are more or less elliptically polarized. Therefore, even if the angular misalignment $\theta$ of the polarization planes is zero, the elliptical polarization of the laser beams will cause the beams to include some amount of noise components whose frequency is the same as the basic beat frequency. Noises are also included in the beams, due to the crosstalk between the two beams transmitted through the optical fiber in the two propagation modes.

In the graphs of FIGS. 8 and 9, solid lines indicate noise-free beat signals, while broken lines indicate noise signals whose frequency is equal to the basic beat frequency. In the case of FIG. 8, the noise-free beat signals and the noise signals are perfectly in phase with each other. In this case, the phase of the composite signal (consisting of the noise-free beat signal and the noise signal) is the same as the noise-free beat signal, i.e., is not influenced by the noise signal. In the case of FIG. 9, however, the phase of the composite signal is shifted o offset from the noise-free beat signal by an amount indicated at Q in FIG. 10, due to the phase difference between the noise-free beat signal and the noise signal. This phase error Q is maximum when the phases of the beat and noise signals are shifted from each other by $\pi/2$. This maximum phase error Q is represented by the following equation (8), where "A" represents the amplitude of the beat signal, while "a" represents the amplitude of the noise signal.

$$Q = \sin^{-1}[a/(A^2 + a^2)^{\frac{1}{2}}] \approx a/A \quad (8)$$

As is apparent from the above equations (4) and (6), the phases of the electric field energies of the two laser beams transmitted through the optical fiber are changed or shifted by $\Phi_1(t)$ and $\Phi_2(t)$, respectively, due to the external disturbances such as the heat and pressure to which the optical fiber is exposed. Accordingly, the value $[\Phi_1(T) - \Phi_2(t)]$ in the above equation (3) is changed, whereby the phase of the beat signal with respect to the phase of the noise signal is changed. Hence, the phase of the beat signal is changed or shifted by the noise whose frequency is equal to the above-indicated basic beat frequency. Each of the two laser beams transmitted through the optical fiber is subsequently split into the reference and measuring beams. The measuring beam is further split into two measuring beams, one of which is incident upon and reflected by the subject and is combined with the other measuring beam, so that the beat frequency of these two measuring beams is detected. Although the influence of noise components on this beat frequency of the measuring beams is considerably reduced by a conventionally used differential amplifier as described above, the conventional arrangement does not use a differential amplifier for the beat signal of the reference beams, and therefore suffers from the noises which influence the phase of the beat signal of the reference beams, causing deterioration of the measuring accuracy of the conventional heterodyne measuring apparatus.

Where single laser beam is transmitted through optical fiber

In this case, the linearly polarized laser beam emitted from the distal end of the optical fiber is converted by an optical frequency shifter into two linearly polarized laser beams which have mutually perpendicular polarization planes. If the laser beam emitted from the optical fiber is perfectly linearly polarized, there arises no problem in connection with the noise. Actually, however, the laser beam as produced by the laser source is elliptically polarized in some degree. Even if the perfectly linearly polarized laser beam is produced by the laser source, the laser beam may be often elliptically polarized due to some angular misalignment of the laser source and the optical fiber. Therefore, some amount of elliptically polarized components of the linearly polarized laser beam will influence the two linearly polarized laser beams obtained from the optical frequency shifter. Namely, the noise components whose frequency is equal to the basic beat frequency are included in the optical energies of the laser beams produced by the optical frequency shifter, as indicated by the above equations (5) and (7). It is also noted that the amount of elliptical polarization of the linearly polarized laser beam is affected by the external disturbances such as heat and vibrations to which the optical fiber is exposed. Accordingly, the value $[\Phi_1(t)-\Phi_2(t)]$ in the above equation (3) is changed, whereby the relative phase of the beat signal and the noise signal fluctuate, that is, the phase of the composite signal as obtained fluctuate. In the present case, too, the use of a differential amplifier according to the conventional arrangement considerably reduces the influence of the noise components on the beat signal. However, the conventional arrangement still suffers from the noises with respect to the reference beat signal.

SUMMARY OF THE INVENTION

It is therefore an object of the present invention to provide an optical heterodyne measuring apparatus which is protected from deterioration of the measuring accuracy due to adverse influences of external disturbances to which a fixed-polarization-plane optical fiber is exposed.

The above object may be attained according to the principle of the present invention, which provides an optical heterodyne apparatus wherein two linearly polarized reference beams having different frequencies, and two linearly polarized measuring beams identical with the reference beams are obtained from a laser beam or beams which is/are transmitted from a laser source to a measuring portion of the apparatus through a fixed-polarization-plane optical fiber, and a measurement of a subject is effected based on a difference between a beat frequency of the reference beams, and a beat frequency of the measuring beams which varies depending upon a parameter of the subject which is to be measured, comprising: optical means for obtaining two reference beams whose beat phases are different from each other by 180°, and two measuring beams whose beat phases are different from each other by 180°; a first pair of photosensors receiving the two reference beams and producing two electric reference beat signals; a second pair of photosensors receiving the two measuring beams and producing two electric measuring beat signals; first differentially amplifying means receiving the reference beat signals and producing a differentially amplified output; and second differentially amplifying means receiving the measuring beat signals and producing a differentially amplified output.

In the optical heterodyne measuring apparatus, the optical means is provided to produce not only the two measuring beams whose beat phases are different from each other by 180°, but also the two reference beams whose beat phases are also different from each other by 180°. These reference and measuring beams are received by the first and second pair of photosensors, respectively. The electric reference beat signals produced by the first pair of photosensors are differentially amplified by the first differentially amplifying means, while the electric measuring beat signals produced by the second pair of photosensors are differentially amplified by the second differentially amplifying means. Therefore, the output of the first differentially amplifying means associated with the reference beat signals, as well as the output of the second differentially amplifying means associated with the measuring beat signals, is subject to reduced amounts of influence of the noise components whose frequencies are equal to the basic beat frequency and which are caused by the external disturbances to which the optical fiber is exposed. In other words, the errors included in the reference and measuring beat signals due to the noise components may be substantially eliminated. Thus, the instant optical heterodyne measuring apparatus provides improved measuring accuracy.

The laser source may be a He-Ne Zeeman laser which produces two linearly polarized laser beams whose polarization planes are perpendicular to each other and whose frequencies are different from each other. In this case, the two linearly polarized laser beams are transmitted from the He-Ne Zeeman laser to the measuring portion through the optical fiber.

Alternatively, the laser source may be adapted to produce a single linearly polarized laser beam. In this instance, the apparatus further comprises an optical frequency shifter which receives the single linearly polarized laser beam which has been transmitted through the optical fiber. The optical frequency shifter converts the laser beam into two linearly polarized laser beams whose polarization planes are perpendicular to each other and whose frequencies are different from each other.

In one form of the invention, the optical means comprises a non-polarizing beam splitter which receives two linearly polarized beams whose polarization planes are perpendicular to each other and whose frequencies are different from each other, and splits each of the two linearly polarized beams into two halves, a first polarizing beam splitter which receives one of the two halves of each linearly polarized beam and which produces the two reference beams whose beat phases are different from each other by 180°, a second polarizing beam splitter which receives the other of the two halves of each linearly polarized beam and which produces a pair of linearly polarized beams whose frequencies are equal to those of the two linearly polarized beams, the second polarizing beam splitter directing one of the pair of linearly polarized beams toward the subject, a mirror which receives and reflects the other of the pair of linearly polarized beams; and a third polarizing beam splitter which receives the one and other linearly polarized beams reflected by the subject and the mirror, and produces the two measuring beams.

In one arrangement of the above form of the invention, the first polarizing beam splitter producing the two reference beams is disposed such that an incidence plane of the first polarizing beam splitter is inclined 45° with respect to a polarization plane of the above-indicated one of the two halves of each linearly polarized beam received from the non-polarizing beam splitter.

In another arrangement of the above form of the invention, a ¼ waveplate or a Faraday effect element is disposed between the non-polarizing beam splitter and the first polarizing beam splitter.

In a further arrangement of the above form of the invention, the third polarizing beam splitter producing the two measuring beams is disposed such that an incidence plane of the third polarizing beam splitter is inclined 45° with respect to polarization planes of the one and other linearly polarized beams which have been reflected by the subject and the mirror and which are received from the second polarizing beam splitter.

In a still further arrangement of the same form of the invention, a ¼ waveplate or a Faraday effect element is disposed between the second polarizing beam splitter and the third polarizing beam splitter.

In another form of the invention, calculating means is provided for calculating the parameter such as the surface roughness of the subject, based on a difference between phases of the differentially amplified outputs of the first and second differentially amplifying means.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
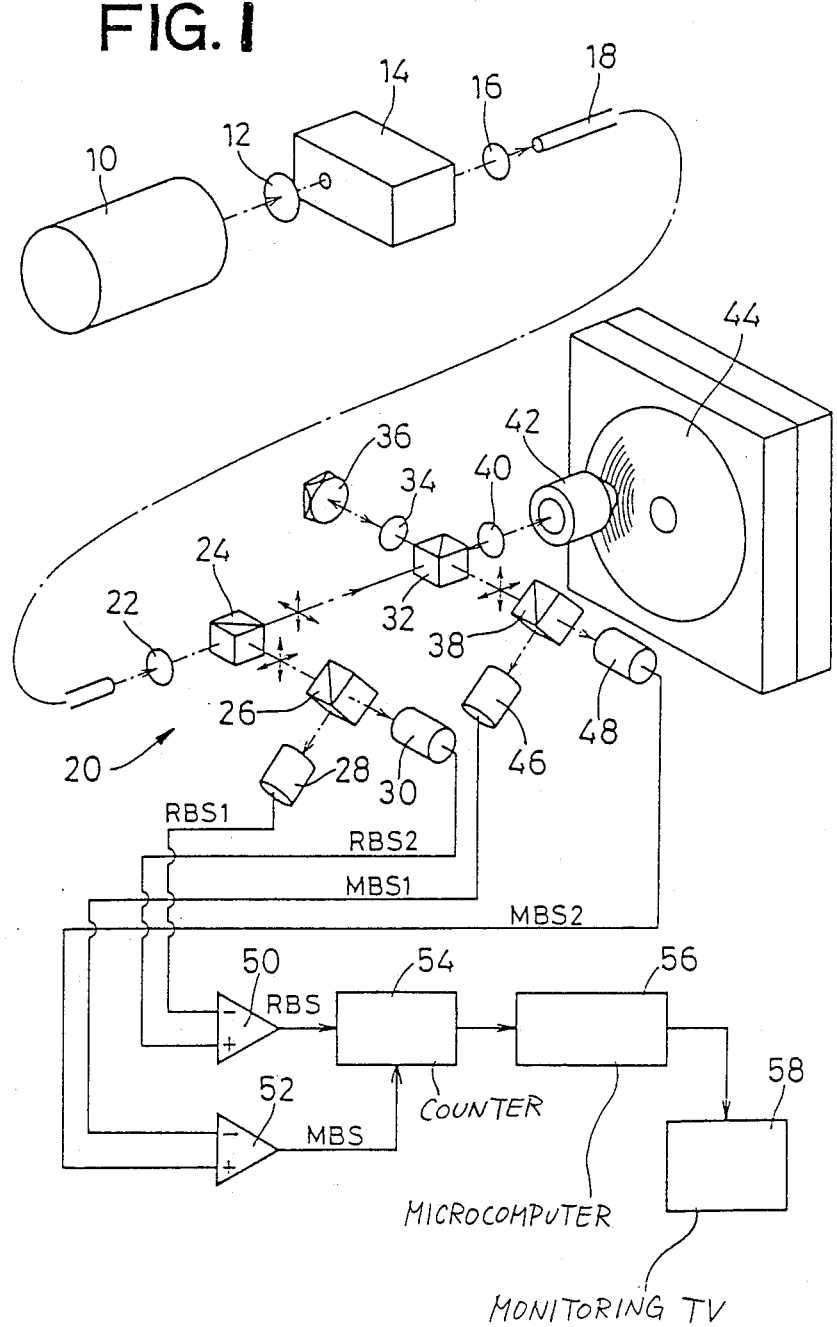
FIG. 1 is a schematic view illustrating an arrangement of one embodiment of an optical heterodyne measuring apparatus of the present invention.

Referring first to FIG. 1, a laser source 10 in the form of a He-Ne laser of the horizontal Zeeman type produces two linearly polarized laser beams whose frequencies are different from each other and whose polarization planes are perpendicular to each other. Usually, these laser beams are not perfectly linearly polarized, but are more or less elliptically polarized beams. To assure perfect linear polarization of the laser beams as produced by the laser source 10, the laser beams are passed through a ¼ waveplate 12. However, the intensity amplitude of the thus compensated linearly polarized laser beams includes a noise component whose frequency is two times as high as the basic beat frequency of the two laser beams (more precisely, noise components whose frequencies are larger multiples of the basic beat frequency). It is presumed that the noise component is produced by the laser source 10 itself, or due to a manufacturing error of the ¼ waveplate 12. The basic beat frequency indicated above is the frequency of a beat beam which occurs by the interference of the two linearly polarized beams produced by the laser source 10. More specifically, the beat frequency is equal to a difference between the frequencies of the two linearly polarized laser beams.

The laser beams which have passed the ¼ waveplate 12 are transmitted through an optical frequency shifter 14, and are converged by a lens 16, on the proximal end face of a fixed-polarization-plane optical fiber 18. The incident laser beams are transmitted through the optical fiber 18 toward its distal end such that the polarization planes of the beams are maintained (not rotated during the propagation through the optical fiber). Thus, the laser beams are directed to a measuring portion of the measuring apparatus, which is indicated generally at 20 in FIG. 1. If the adjustment of the ¼ waveplate 12 is not accurate or adequate, the laser beams emitted from the laser source 10 are incident upon the optical fiber 18, as more or less elliptically polarized beams. As a result, when the laser beams are propagated through the optical fiber 18, in the two transmission modes of the fiber, the intensity amplitude of each mode includes a noise component whose frequency is equal to the basic beat frequency, as is understood from the above equations (4) through (7). The optical frequency shifter 14 functions as an optical isolator for preventing the reflected beams from the optical fiber 18, from being directed back to the laser source 10, in order to eliminate an adverse influence of the reflected beams on the operation of the laser source 10, i.e., to assure operating stability of the laser source 10.

The laser beams emitted from the distal end of the optical fiber 18 are converted by a lens 22 into parallel rays, and are partially reflected by a non-polarizing beam splitter 24. The laser beams reflected by the beam splitter 24 are incident upon a polarizing beam splitter 26, as reference beams. This polarizing beam splitter 26 has an incidence plane which are inclined 45° with respect to the polarization planes of the incident two linearly polarized beams (reference beams). Accordingly, each of the two linearly polarized reference beams incident upon the beam splitter 26 is split into two halves, which are incident upon respective photosensors 28, 30 in the form of photodiodes or phototransistors, for example. These photosensors 28, 30 produce electric signals whose frequencies vary with the basic beat frequencies. These electric signals are referred to as reference beat signals RBS1, RBS2, respectively.

Figure 6:
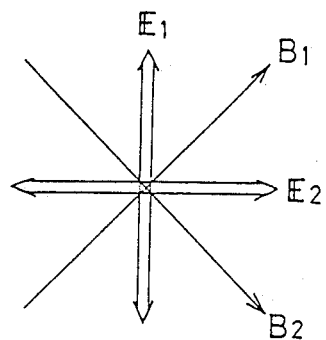
FIG. 6 is a view explaining the intensity of two laser beams having mutually perpendicular polarization planes, when the beams interfere with each other in a direction inclined 45° with respect to the polarization planes.
Figure 7:
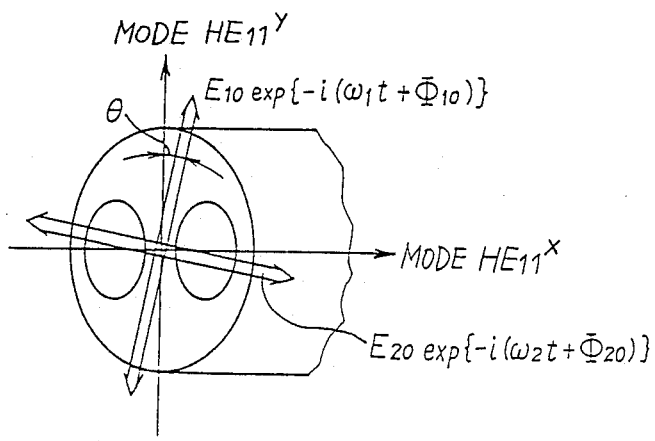
FIG. 7 is a view showing a deviation of the mutually perpendicular polarization planes of two laser beams by an angle $\theta$ from the nominal planes, when the beams are incident upon one end of a fixed-polarization-plane optical fiber.

The phases of these reference beat signals RBS1, RBS2 are shifted from each other by 180°, since the linearly polarized reference beams are split by the polarizing beam splitter 26 whose incidence plane is inclined 45° with respect to the polarization planes of the incident reference beams. Described more specifically referring to FIG. 6, the polarizing beam splitter 26 splits the two linearly polarized reference beams having the vertical and horizontal polarization planes, into two components having polarization planes B1, B2 which are rotated 45° from the vertical and horizontal planes. These two components interfere with each other. An intensity I1 of the interfering beams in the direction B1 is expressed by the above equation (3), while an intensity I2 of the interference beams in the direction B2 is expressed by the following equation (9), since the positive and negative signs of the components of the linearly polarized interfering beams in the direction B2 which have the vertical polarization planes are reversed with respect to those of the interfering beams in the direction B1. That is, the phase of the intensity I2 is offset by an amount of $\pi$, i.e., 180° from that of the intensity I1. It will be understood, therefore, that the polarizing beam splitter 26 functions as optical means for obtaining two reference beams whose beat phases are different from each other by 180°.

$$I_2 = |-\sin 45° \cdot E_1 + \cos 45° \cdot E_2|^2 \quad (9)$$

$$= |E_1(t)\sin 45° \cdot \exp\{-i(\omega_1 t + \Phi_1(t) + \pi)\} +$$

$$E_2(t)\cos 45° \cdot \exp\{-i(\omega_2 t + \Phi_2(t))\}|^2$$

$$= \tfrac{1}{2}|E_1(t)|^2 + \tfrac{1}{2}|E_2(t)|^2 + |E_1(t)| |E_2(t)| \cdot$$

$$\cos\{(\omega_1 - \omega_2)t + (\Phi_1(t) - \Phi_2(t)) + \pi\}$$

The laser beams which have been transmitted through the non-polarizing beam splitter 24 serve as measuring beams, which are incident upon a polarizing beam splitter 32. Each measuring beam incident upon the beam splitter 32 are split into two linearly polarized beams having different frequencies. The linearly polarized beams reflected by the beam splitter 32 are transmitted through a ¼ waveplate 34 and reflected by a stationary mirror 36 back toward the ¼ waveplate 34. With the beams passing through the ¼ waveplate 34, the polarization planes are rotated 90°, whereby the beams from the ¼ waveplate 34 are transmitted through the beam splitter 32 and are incident upon a polarizing beam splitter 38.

The linearly polarized beams which have been transmitted through the polarizing beam splitter 32 straight forward are transmitted through a ¼ waveplate 40, and are converged by object lens 42, on the surface of a subject in the form of a magneto-optical storage disk 44. The beams irradiating the surface of the disk 44 are reflected back toward the beam splitter 32, through the object lens 42 and the ¼ waveplate 40. With the beams transmitted through the ¼ waveplate 40, the polarization planes of the beams are rotated 90°, whereby the beams incident upon the beam splitter 32 are reflected by the beam splitter 32, and are incident upon the polarizing beam splitter 38. The subject 44 is supported movably in a direction perpendicular to the optical axis of the object lens 42, relative to the optical axis.

The polarizing beam splitter 38 has the same function as the polarizing beam splitter 26 described above. Namely, the incidence plane of the beam splitter 38 is inclined 45° with respect to the polarization planes of the two incident linearly polarized measuring beams, so that each of the incident beams is split into two halves, which are incident upon respective photosensors 46, 48. These photosensors 46, 48 produce electric signals whose frequencies vary with the beat frequencies of the measuring beams. These electric signals are referred to as measuring beat signals MBS1, MBS2, respectively. The phases of these reference beat signals MBS1, MBS2 are different from each other by 180°, since the linearly polarized reference beams are split by the polarizing beam splitter 38 whose incidence plane is inclined 45° with respect to the polarization planes of the incident reference beams. It will be understood, therefore, that the polarizing beam splitter 38 functions as optical means for obtaining two measuring beams whose beat phases are different from each other by 180°.

The laser source 10, the optical elements between the laser source 10 and the proximal end of the optical fiber 18, the optical elements between the distal end of the optical fiber 18 and the subject 44, and the photosensors 28, 30, 46, 48 are all fixedly supported by a suitable housing not shown.

Suppose the linearly polarized beams reflected by the subject 44 are represented by the above equation (1), while the linearly polarized beams reflected by the mirror 36 are represented by the above equation (2), the measuring beat signals MSB1, MSB2 are represented by the above equation (3). However, an amount of change $\Phi_1(t)$ in the phase of the beams reflected by the subject 44 varies with a change in the length of the optical path of the beams reflected by the subject 44, that is, with a change in the surface roughness condition of the subject 44. Suppose x(t) represents a distance of relative movement of the subject 44 and the optical axis of the object lens 42 in a direction perpendicular to the optical axis, $\Phi_1(t)$ in the equation (1) is represented by $\Phi_1[x(t)]$. A rate of change of $\Phi_1[x(t)]$ per unit time, i.e, $(d\Phi_1/dx)\cdot(dx/dt)$ is equal to an amount of the Doppler shift of the frequency $\omega_1$ of the linearly polarized beams. In other words, the amount of the Doppler shift is determined by the term $(d\Phi_1/dx)$ indicative of the surface roughness value of the subject 44, and by the speed $(dx/dt)$ of the relative movement indicated above. On the other hand, an amount of change $\Phi_2(t)$ in the phase of the beams reflected by the mirror 36 is fixed since the mirror 36 is fixed in position, and the measuring beat frequency $(\omega_1-\omega_2)$ is subject to the same frequency shift $(d\Phi_1/dx)\cdot(dx/dt)$. The phase of the measuring beat signals MSB1, MBS2 with respect to that of the reference beat signals RBS1, RBS2, at a point x(t2) during the relative movement distance x(t), varies by an amount equal to the Doppler shift amount differentiated by time, as indicated by the following equation (10), where x(t1) is the start point of the relative movement distance x(t):

$$\int_{t_1}^{t_2} (d\Phi_1/dx)\cdot(dx/dt)\cdot dt = \int_{x(t_1)}^{x(t_2)} (d\Phi_1/dx)\cdot dx = \quad (10)$$

$$\Phi_1(x(t_2)) - \Phi_1(x(t_1))$$

As described above, the phase of the measuring beat signals MBS1, MBS2 is shifted or different from that of the reference beat signals RBS1, RBS2, by an amount corresponding to a change in the surface roughness condition of the subject 44 in the area irradiated by the measuring beams while the subject 44 is moved relative to the object lens 42. A difference between the phases of the measuring and reference beat signals, i.e., a phase difference $\Delta\phi$ obtained from the above equation (10) is represented by $(2\pi/\lambda)\cdot 2\Delta h$, where $\lambda$ represents the wavelength of the measuring beams irradiating the subject 44, and $\Delta h$ represents the surface roughness condition of the subject 44.

Figure 8:
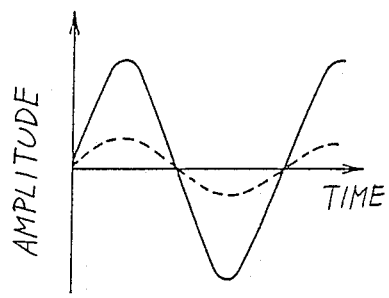
FIG. 8 is a view indicating a noise signal superposed on a beat signal such that the two signals are in phase with each other.
Figure 10:
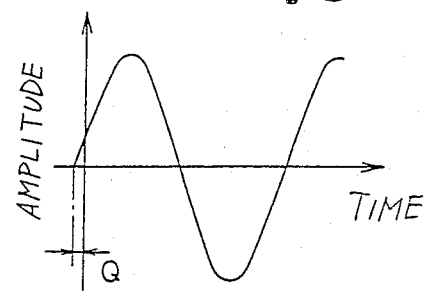
FIG. 10 is a view indicating a composite signal constituted by the beat and noise signals of FIG. 9.
Figure 9:
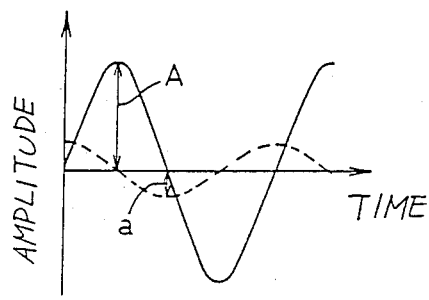
FIG. 9 is a view indicating the noise signal superposed on the beat signal such that the phases of the two signals are shifted from each other.

The reference beat signals RBS1, RBS2 and the measuring beat signals MBS1, MBS2 include the noise components whose frequencies ar equal to the basic beat frequency or two times as high as the basic beat frequency, as described above. If the noise component and the beat component are perfectly in pase with each other, as indicated in FIG. 8, the phase of the composite signal (reference or measuring beat signal as obtained) is not adversely affected by the noise component. However, if these noise and beat components are not in phase with each other, as indicated in FIG. 9, the phase of the composite signal has an error Q as indicated in FIG. 10. Since the laser beams are transmitted through the fixed-polarization-plane optical fiber 18 in the two propagation modes, the beams are subject to the phase shifts by respective amounts $\Phi_1(t)$ and $\Phi_2(t)$, due to external disturbances such as temperature change and vibrations to which the optical fiber 18 are exposed. As a result, the phases of the reference and measuring beams are shifted from those of the noise components. Accordingly, the phases of the reference and measuring beat signals RBS1, RBS2, MBS1, MBS2 tend to be influenced by the noise components.

The reference beat signals RBS1, RBS2 and the measuring beat signals MBS1, MBS2 are amplified by respective differential amplifiers 50, 52, so that the influence of the noise components is considerably reduced. While $|E_1(t)|^2$ and $|E_2(t)|^2$ in the above equations (3) and (9) include the noise components whose frquencies are equal to the basic beat frequencies, the terms $\frac{1}{2}|E_1(T)|^2$ and $\frac{1}{2}|E_2(t)|^2$ in the equations (3), (9) are cancelled by each other by the differential amplification, whereby the noise component is eliminated from the reference and measuring beat signals, and therefore only the desired component $|E_1(t)||E_2(t)|\cdot\cos\{(\omega_1-\omega_2)t+(\Phi_1(t)-\Phi_2(t))\}$ is amplified by two times. However, since the noise component is left included in the term $|E_1(t)||E_2(t)|$, all the noise components which are included in the reference and measuring beams (reference and measuring beat signals) due to the transmission through the optical fiber 18 are not completely eliminated.

It is also noted that the reference and measuring beat signals RBS, MBS have been frequency modulated due to the vibrations applied to the optical fiber 18. However, the influence of this frequency modulation may be eliminated, for example, by obtaining multiple sets of data on the same subject 44 and averaging the obtained data, or processing an obtained set of data on the subject according to the frequency of the reference beat signals RBS which is simultaneously monitored. In the latter case, the surface roughness of the subject 44 can be measured at a higher speed than the former case.

The reference and measuring beat signals RBS, MBS whose noise components have been thus reduced are converted into rectangular pulse signals by suitable waveform shaping elements. These pulse signals are applied to a counter 54, which produces an output signal indicative of the phase difference $\Delta\phi$ of the reference and measuring beat signals RBS, MBS. This phase difference $\Delta\phi$ may be obtained by counting reference pulse signals having a frequency of about 100MHz, for example, according to the output signals of the differential amplifiers 50, 52 applied to the counter 54. If the basic beat frequency indicated above is about 100kHz, 1000 reference pulses represent a phase difference of $2\pi$. Based on the thus obtained phase difference $\Delta\phi$ represented by an output signal of the counter 54, a microcomputer 56 calculates the surface roughness $\Delta h$ of the subject 44 (amount of displacement of the irradiated area of the subject 44), in increments of $\lambda/2000$, thus permitting the measurement of the surface roughness with a sufficiently high resolution. If the phase difference $\Delta\phi$ of the reference and measuring beat signals RBS and MBS is larger than $2\pi$, that is, if the surface roughness amount $\Delta h$ is larger than $\lambda/2$, the surface roughness amount $\Delta h$ can be obtained by mutiplying a difference of the beat frequencies of the signals RBS and MBS, by $\lambda/2$.

Figure 2:
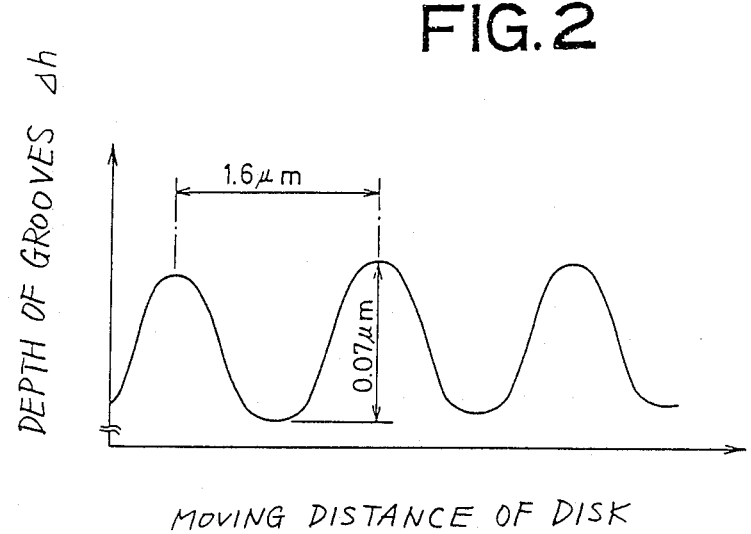
FIG. 2 is a view showing a profile of grooves in a magneto-optical disk, which are measured by the measuring apparatus of FIG. 1.

The roughness condition or profile of an irradiated or measured portion of the surface of the subject 44 is displayed on a monitoring TV 58 connected to the microcomputer 56. The graph in FIG. 2 shows a profile of grooves formed in a magneto-optical storage disk as an example of the subject 44. The surface roughness $\Delta h$, i.e., depth of the groove is taken along the ordinate of the graph while a moving distance of the disk relative to the object lens 42 is taken along the abscissa of the graph. Thus, it will be understood that the instant optical heterodyne measuring apparatus is capable of accurately measuring the pitch, width, depth and other parameters of the grooves, at a high speed, without damaging or scoring the surface of the disk. While the grooves formed in the surface of the disk are rectangular in shape, the grooves as displayed on the monitoring TV 58 are in the form of a sine wave. This is because the spacial intensity distribution of the laser beam which irradiates the surface of the grooves takes the form of a Gaussian distribution over a beam diameter range of about 0.8 micron.

In the present embodiment, the linearly polarized reference beams incident upon the polarizing beam splitter 26 are converted into the two reference beat beams whose phases are shifted from each other by 180°. Similarly, the linearly polarized measuring beams incident upon the polarizing beam splitter 38 are converted into the two measuring beat beams whose phases are also shifted from each other by 180°. These reference and measuring beat beams are converted by the respective photosensors 28, 30, 46, 48 into the reference beat signals RBS1, RBS2, and the measuring beat signals MBS1, MBS2, which are differentially amplified by the differential amplifiers 50, 52 and are subsequently processed to obtain an output indicative of the surface roughness of the subject 44. While the reference and measuring beat signals RBS1, RBS2, MBS1, MBS2 may include noise components due to the external disturbances applied to the optical fiber 18 during transmission of the laser beams through the fiber, the above-desribed arrangement is capable of considerably reducing an undesirable influence of these noise components whose frequencies are equal to the basic beat frequencies of the reference and measuring beams. Accordingly, the instant optical heterodyne measuring apparatus is capable of effecting highly accurate measurement of the surface roughness of the subject 44.

There will be described other embodiments of the present invention, referring to FIGS. 3, 4 and 5, wherein the same reference numerals as used in FIG. 1 will be used to identify the functionally corresponding components, which will not be described in the interest of brevity and simplification.

Figure 3:
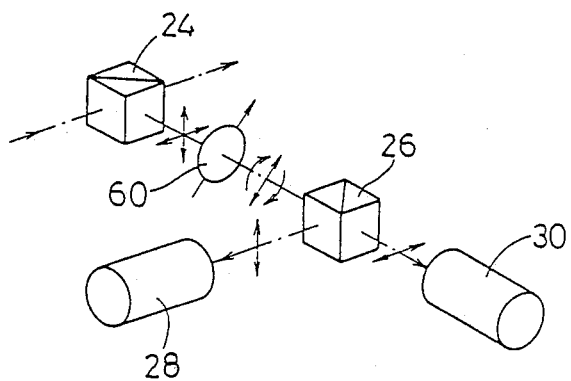
FIG. 3 is a fragmentary view of another embodiment of the invention.

In the embodiment shown in FIG. 3, there is disposed a ¼ waveplate 60 between the non-polarizing beam splitter 24 and the polarizing beam splitter 26, such that the incidence plane of the ¼ waveplate 60 is inclined or rotated 45° with respect to the polarization planes of the two linearly polarized reference beams. In this arrangement, the linearly polarized reference beams are converted by the ¼ waveplate 60 into circularly polarized beams. Therefore, the polarizing beam splitter 26 may be disposed such that its incidence plane lies in the horizontal plane. This permits the photosensor 28 as well as the photosensor 30 to be disposed in the horizontal plane. It will be appreciated that a similar ¼ waveplate may be provided between the non-polarizing beam splitter 32 and the polarizing beam splitter 38, for permitting the photosensor 46 to be disposed in the horizontal plane. Further, such ¼ waveplates may be replaced by other suitable optical elements such as a Faraday effect element for rotating the polarization planes of the linearly polarized beams by 45° about the optical axis.

Figure 4:
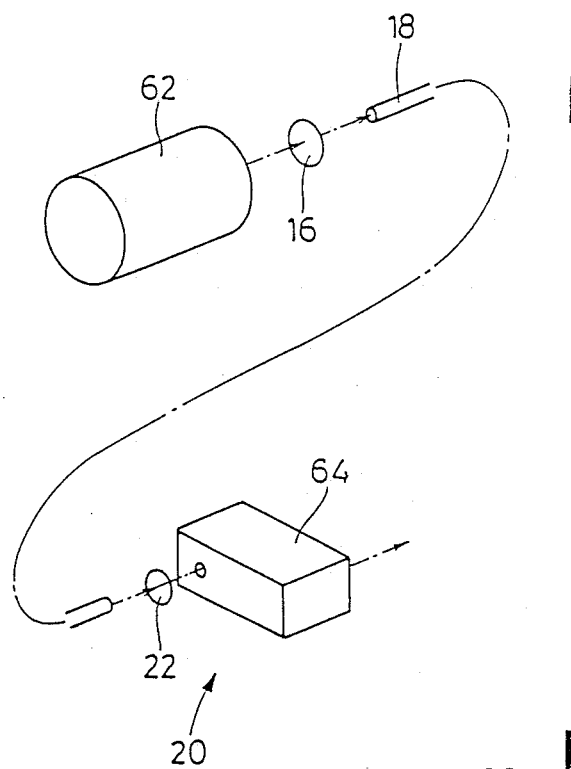
FIG. 4 is a fragmentary view of a further embodiment of the invention.

The embodiment of FIG. 4 uses a laser source 62 which produces a single linearly polarized laser beam such as He-Ne laser. This laser beam is incident upon the fixed-polarization-plane optical fiber 18, through the lens 16, and the incident laser beam is transmitted through the optical fiber 18, in one of the two transmission modes, to the measuring portion 20 of the apparatus at the distal end of the optical fiber-18 The laser beam emitted from the distal end of the optical fiber 18 is converted into parallel rays by the lens, and is incident upon an optical frequency shifter 64. This frequency shifter 64 converts the received laser beam into two linearly polarized beams whose polarization planes are perpendicular to each other and whose frequencies are different from each other. An example of an arrangement of the optical frequency shifter 64 is illustrated in FIG. 5. In this example, the laser beam is incident upon a polarizing beam splitter 66 such that the polarization plane of the incident laser beam is inclined or rotated 45° with respect to the plane of the frequency shifter (plane of the drawing figure). As a result, the incident laser beam is split into a linearly polarized beam whose polarization plane is parallel to the plane of the frequency shifter 64, and a linearly polarized beam whose polarization plane is perpendicular to the plane of the frequency shifter. The thus obtained linearly polarized laser beams reflected by and transmitted through the beam splitter 66 are incident upon respective optical modulators in the form of acousto-optical modulators 68, 70, so that the frequencies of the incident laser beams are shifted or changed. The output laser beams of the acousto-optical modulators 68, 70 merge with each other at a polarizing beam splitter 72, into the two laser beams which propagage along the same optical axis. These laser beams have the mutually perpendicular polarization planes, and the frequencies whose difference is equal to a difference between the frequencies of the drive signals applied to the acousto-optical modulators 68, 70. Reference numerals 74, 76, 78 in FIG. 5 denote reflector prisms for reflecting the laser beams.

If the laser beam emitted from the distal end of the optical fiber 18 is a perfectly linearly polarized, the laser beam is not influenced by the external disturbances to which the fiber 18 is exposed during transmission of the laser beam therethrough. Usually, however, the laser beam produced by the laser source 62 is more or less elliptically polarized. The elliptically polarized component of the laser beam will adversely affect the two laser beams obtained from the optical frequency shifter 64. Namely, the linearly polarized laser beams emitted from the polarizing beam splitter 72 include noise components whose frequency is equal to the basic beat frequency. Further, the more or less elliptically polarized linearly polarized laser beam is influenced by the external disturbances such as heat and vibrations applied to the optical fiber 18, whereby the phases of the linearly polarized laser beam emitted from the optical fiber 18 may fluctuate, and the phase relation of the laser beam with the noise component. Thus, the phases of the reference and measuring beat signals RBS1, RBS2, BMS1, BMS2 obtained from the photosensors 28, 30, 46, 48 also include errors from the nominal values, due to the inclusion of the noise components, as in the first embodiment.

It is also noted that the linearly polarized laser beam obtained from the polarizing beam splitter 66 tend to be more or less elliptically polarized, due to some manufacturing error of the splitter 66. Consequently, the intensity amplitudes of the linearly polarized laser beams emitted from the optical frequency shifter 64 include noise components whose frequency is equal to the basic beat frequency.

However, the differential amplifiers 50, 52 also used in the present embodiment considerably reduce the influence of the noise components on the reference and measuring beat signals RBS1, RBS2, MBS1, MBS2. In the present embodiment, the basic beat frequency is equal to the difference between the drive frequencies of the two acousto-optical modulators 68, 70.

While the present invention has been described in its presently preferred embodiments with some degree of particularity, it is to be understood that the invention is not limited to the details of the illustrated embodiments, but may be otherwise embodied.

For example, the polarizing beam splitters 26, 38 used as the means for obtaining two reference beams having a 180° phase difference, and two measuring beams having a 180° phase difference may be replaced other suitable optical elements such as Wollaston polarizing prism or other polarizing prisms.

Figure 5:
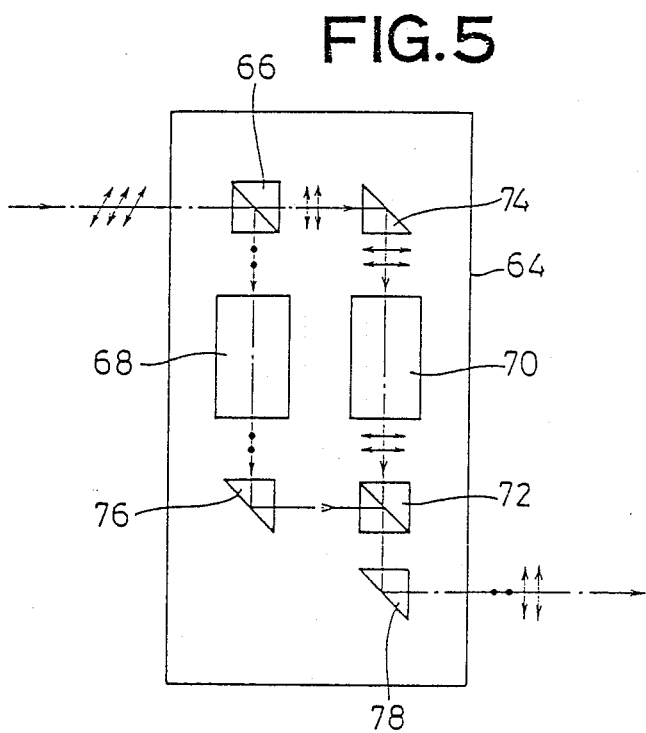
FIG. 5 is a view illustrating an arrangement of an optical frequency shifter used in the embodiment of FIG. 4.

The arrangement of the optical frequency shifter 64 is shown in FIG. 5 for illustrative purpose only, and may be suitably modified or replaced by other arrangements.

It will be understood to those skilled in the art that various other changes, modifications and improvements may be made in the invention, without departing from the spirit and scope of the invention defined in the following claims.

What is claimed is:

1. An optical heterodyne measuring apparatus wherein two linearly polarized reference beams having different frequencies, and two linearly polarized measuring beams identical with the reference beams are obtained from a laser beam or beams which is/are transmitted from a laser source to a measuring portion of the apparatus through a fixed-polarization-plane optical fiber, and a measurement of a subject is effected based on a difference between a beat frequency of the reference beams, and a beat frequency of the measuring beams which varies depending upon a parameter of the subject which is to be measured, comprising:

optical means for obtaining two reference beams whose beat phases are different from each other by 180° and two measuring beams whose beat phases are different from each other by 180°;

a first pair of photosensors receiving said two reference beams and producing two electric reference beat signals;

a second pair of photosensors receiving said two measuring beams and producing two electric measuring beat signals;

first differentially amplifying means receiving said reference beat signals and producing a differentially amplified output; and second differentially amplifying means receiving said measuring beat signals and producing a differentially amplified output.

2. An optical heterodyne measuring apparatus according to claim 1, wherein said laser source comprises a He-Ne Zeeman laser which produces two linearly polarized laser beams whose polarization planes are perpendicular to each other and whose frequencies are different from each other, said two linearly polarized laser beams being transmitted from said He-Ne Zeeman laser to said measuring portion through said optical fiber.

3. An optical heterodyne measuring apparatus according to claim 1, wherein said laser source produces a single linearly polarized laser beam, and further comprising an optical frequency shifter which receives said single linearly polarized laser beam which has been transmitted through said optical fiber, said optical frequency shifter converting said laser beam into two linearly polarized laser beams whose polarization planes are perpendicular to each other and whose frequencies are different from each other.

4. An optical heterodyne measuring apparatus according to claim 1, wherein said optical means comprises:

a non-polarizing beam splitter which receives two linearly polarized beams whose polarization planes are perpendicular to each other and whose frequencies are different from each other, and splits each of said two linearly polarized beams into two halves;

a first polarizing beam splitter which receives one of said two halves of said each linearly polarized beam and which produces said two reference beams whose beat phases are different from each other by 180°;

a second polarizing beam splitter which receives the other of said two halves of said each linearly polarized beam and which produces a pair of linearly polarized beams whose frequencies are equal to those of said two linearly polarized beams, said second polarizing beam splitter directing one of said pair of linearly polarized beams toward said subject;

a mirror which receives and reflects the other of said pair of linearly polarized beams; and a third polarizing beam splitter which receives said one and other linearly polarized beams reflected by said subject and said mirror, and produces said two measuring beams.

5. An optical heterodyne measuring apparatus according to claim 4, wherein said first polarizing beam splitter producing said two reference beams is disposed such that a incidence plane of said first polarizing beam splitter is inclined 45° with respect to a polarization plane of said one of said two halves of said each linearly polarized beam received from said non-polarizing beam splitter.

6. An optical heterodyne measuring apparatus according to claim 4, further comprising one of a ¼ waveplate and a Faraday effect element which is disposed between said non-polarizing beam splitter and said first polarizing beam splitter.

7. An optical heterodyne measuring apparatus according to claim 4, wherein said third polarizing beam splitter producing said two measuring beams is disposed such that an incidence plane of said third polarizing beam splitter is inclined 45° with respect to polarization planes of said on and other linearly polarized beams which have been reflected by said subject and said mirror and which are received from said second polarizing beam splitter.

8. An optical heterodyne measuring apparatus according to claim 4, further comprising one of a ¼ waveplate and a Faraday effect element which is disposed between said second polarizing beam splitter and said third polarizing beam splitter.

9. An optical heterodyne measuring apparatus according to claim 1, further comprising calculating means for calculating said parameter, based on a difference between phases of said differentially amplified outputs of said first and second differentially amplifying means.

10. An optical heterodyne measuring apparatus according to claim 1, wherein said parameter is a surface roughness of said subject.

* * * * *